Sept. 27, 1927.
J. A. KINNEY
1,643,662
DIE OPENING AND CLOSING MECHANISM
Filed Dec. 26, 1922     2 Sheets-Sheet 1
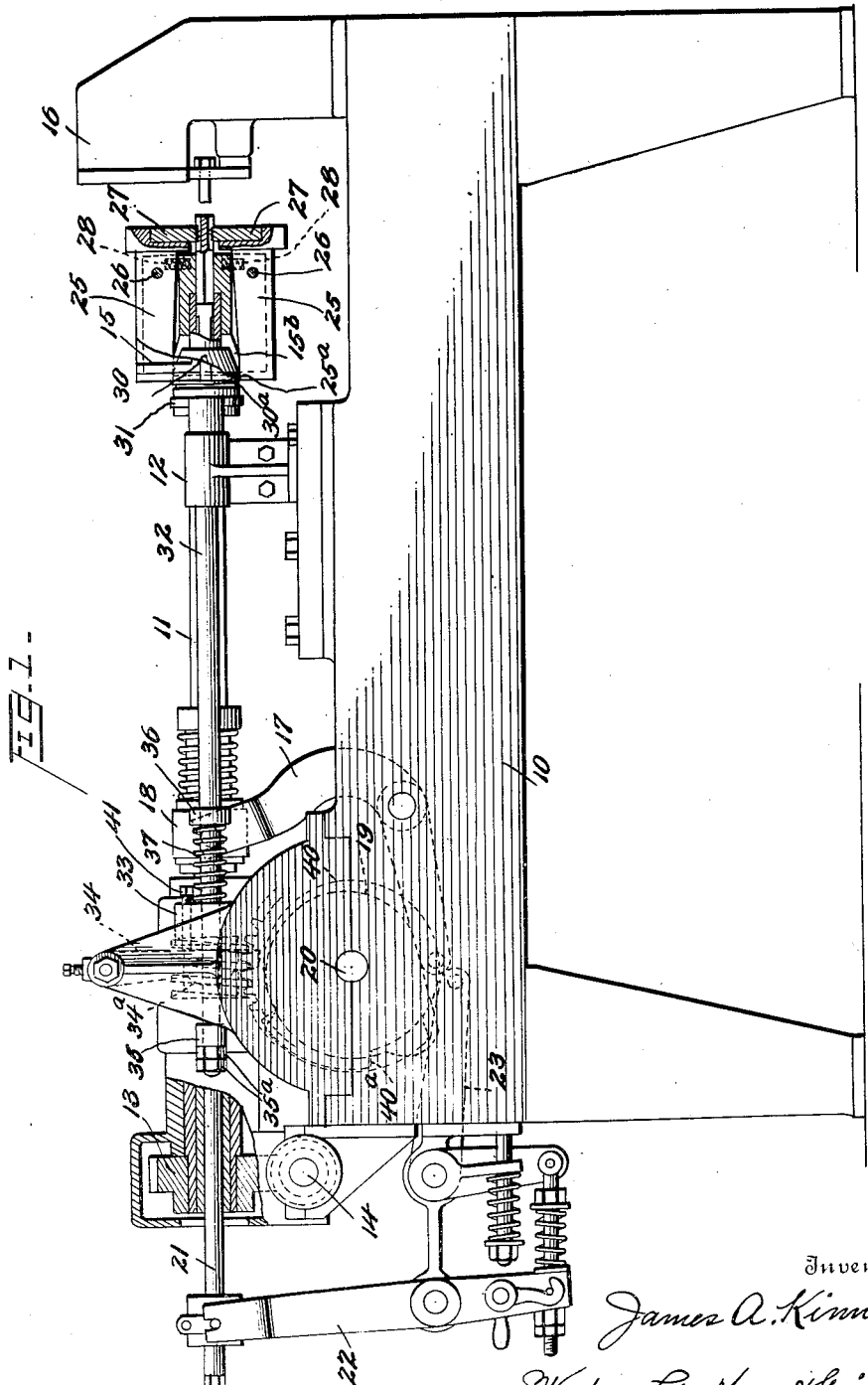

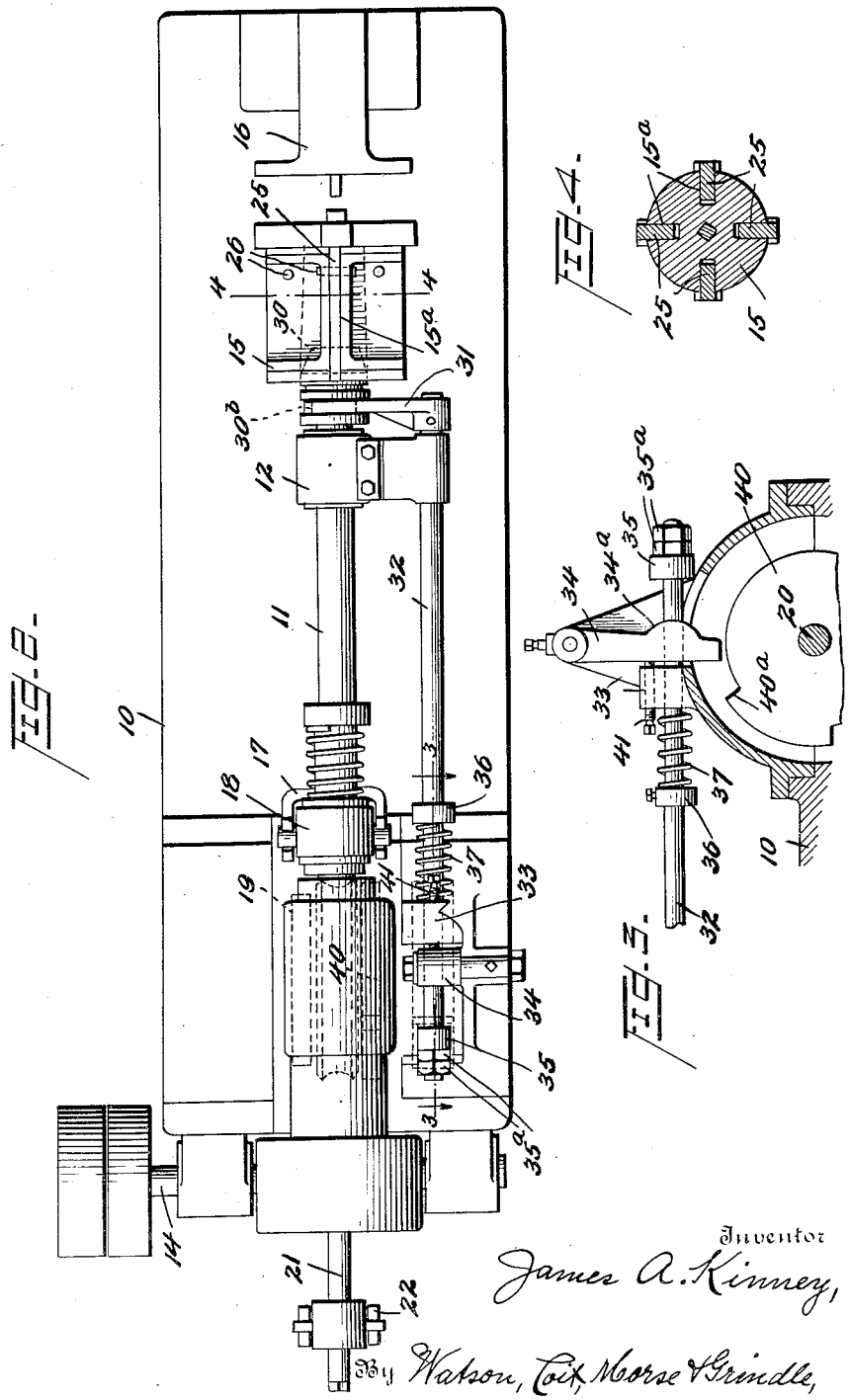

Patented Sept. 27, 1927.

1,643,662

UNITED STATES PATENT OFFICE.

JAMES A. KINNEY, OF LEBANON, PENNSYLVANIA, ASSIGNOR TO BETHLEHEM STEEL COMPANY, OF BETHLEHEM, PENNSYLVANIA, A CORPORATION OF PENNSYLVANIA.

DIE OPENING AND CLOSING MECHANISM.

Application filed December 26, 1922. Serial No. 609,041.

This invention relates to die opening and closing mechanism and particularly mechanism for opening and closing the dies in bolt threading machines of the type shown in my prior application, Serial No. 521,218, filed December 9, 1921.

The object of the invention is to provide a mechanism of this kind which is simple in construction and operation, which is easily attached to a machine of the kind mentioned, and which can be arranged to operate in accurate synchronism with the other parts of the machine to effect opening and closing of the die mechanism at the desired time. Other advantages of the invention will be apparent to those skilled in the art from the following specification taken in connection with the accompanying drawings forming a part thereof and in which:

Figure 1 is a side elevation of a machine with my improved mechanism applied thereto;

Figure 2 is a plan view of the same;

Figure 3 is a partial sectional view on the line 3—3 of Figure 2 showing a portion of the mechanism of the present invention; and Figure 4 is a section on the line 4—4 of Figure 2 showing the arrangement of the jaws in the die head.

In the accompanying drawings the invention is shown applied to a machine like that disclosed in my said prior application Serial No. 521,218. A brief description of this machine will suffice for purposes of this application. It comprises a frame or support 10 upon which is mounted a rotatable spindle 11, the front end of this spindle being supported in a bracket 12 and the rear end being connected to suitable gear mechanism, indicated generally by the numeral 13, which is operated from the drive shaft 14 to cause rotation of the spindle. The spindle 11 carries the die head 15 adjacent to which a stationary blank holder 16 is arranged, preferably being secured to the frame 10. The spindle 11 is movable axially toward and from the blank holder 16, this being accomplished by means of a forked lever 17 which engages a collar 18 rotatably mounted on the spindle 11, the lever 17 being operated by cam mechanism 19 indicated in dotted lines particularly in Figure 1, such cam mechanism being mounted on a cam shaft 20 driven from the main shaft 14. The head 15 is thus advanced toward the blank holder 16 to thread a bolt held therein and is retracted after such threading operation is finished. A pointing tool 21 extends axially through the spindle 11 and head 15, which tool at proper intervals is advanced to point the bolt and retracted by arm 22 connected to a bell crank lever 23 which is also operated by suitable cam mechanism mounted on the cam shaft 20.

Referring now more particularly to the mechanism of the present invention it will be seen that the die head 15 is provided with a series of slots $15^a$ and with a recess $15^b$ at its rear end. A plurality of die jaws 25 are pivotally supported in said slots by means of pivot pins 26 passing therethrough. Each of these jaws at its front end carries a die 27 which dies operate to form the thread on a bolt when the head 15 is advanced and rotated. The jaws 25 extend longitudinally of the head 15 and the dies 27 carried thereby are normally held open or separated by means of coiled springs 28 pocketed in the head, one of such springs being arranged to bear against each of said jaws in front of the pivot pin 26. The jaws 25 extend through the recess $15^b$ of the die head and near its rear end each jaw is provided with a substantially flat inner surface $25^a$ for a purpose later described.

A cone-shaped member 30 is slidably but non-rotatably mounted on the spindle 11. this member being adapted to enter the recess $15^b$ of the head and the same is provided on its periphery with a substantially flat surface $30^a$ which cooperates with the flat surface $25^a$ on the jaws 25. It will be understood that when the cone-shaped member 30 enters or is forced into the recess $15^b$ of the head the rear ends of the jaws 25 will be forced outwardly and the dies 27 closed. When this member is withdrawn from the recess $15^b$ of the head the springs 28 will move the front ends of the jaws outwardly and open the dies.

The cone-shaped member 30 is provided with a circumferential groove $30^b$ which is engaged by a forked yoke 31 secured to a rod 32 which is slidably supported at its front end in the bracket 12 and at its rear end in a bracket 33 rigidly mounted on the frame 10 of the machine. At its rear end the rod 32 passes through an aperture in the lower end of the arm 34, the upper end of which is pivotally supported on the bracket 33. The arm 34 has on its rear side a spherical surface 34ᵃ which is adapted to engage an adjustable collar or abutment 35 mounted on the rod 32 and held in place by the nuts 35ᵃ. An adjustable collar 36 is mounted on the rod 32 in front of the bracket 34 and interposed between such collar and the bracket is a coiled spring 37 which surrounds the rod.

On the cam shaft 20 below the arm 34 there is secured a cam disk 40 provided with a shoulder or cam surface 40ᵃ which is adapted to contact with the arm 34 and swing the same about its point of support on the bracket 33. It will be apparent that when the arm 34 is swung to the right from the position indicated in Figure 3 the rod 32 will be moved longitudinally, assuming that at such time the collar 35 thereon is positioned adjacent the spherical surface 34ᵃ of the arm 34. An adjustable set screw 41 mounted in a part of the bracket 33 is arranged to contact with the arm 34. By varying the position of this set screw the time at which the cam surface 40ᵃ comes in contact with the arm 34 may thus be varied. This arrangement therefore forms a means to regulate the length of thread cut on the blank.

Briefly, the operation of the mechanism is as follows: Assuming the cone-shaped member 30 to be positioned adjacent the bracket 12, it is apparent that when the head 15 is retracted by longitudinal movement of the spindle 11, the member 30 will be caused to enter the recess 15ᵇ of the die head 15, the rear ends of the jaws 25 will be forced outwardly and the dies 27 moved toward each other and in position to cut a thread. When the die head is advanced by movement of the spindle 11 the cone-shaped member 30 will be carried along with the head due to the frictional engagement between the surfaces 25ᵃ of the jaws and the surface 30ᵃ on said member. The dies will thus be maintained closed or in position to thread a blank secured in the holder 16. The operation of the parts is so timed that when the desired length of thread is cut, the cam 40 will swing the arm 34 about its point of support causing the surface 34ᵃ thereon to contact with the collar 35 on the rod 32 and move the latter longitudinally. Such movement of the rod 32 acts to withdraw the cone-shaped member 30 from the recess 15ᵇ of the die head and to restore such member to its position adjacent the bracket 12. When the cone-shaped member 30 is thus withdrawn from the recess 15ᵇ of the head the front ends of the jaws 25 will move outwardly under the influence of the springs 28 and open the dies 27 thus permitting the die head 15 to be again retracted. As previously noted, the time when the cone-shaped member 30 is withdrawn from the head may be varied by adjustment of the set screw 41 so that the length of thread to be cut may be regulated by the adjustment of this set screw. The spring 37 acts as a cushion to decrease the impetus of the rearwardly moving rod 32 as it is moved by the arm 34.

Having thus described the invention what is claimed as new and desired to be secured by Letters Patent is:

1. In a machine for threading bolts or the like, the combination of a rotatable spindle, cam mechanism for advancing and retracting the spindle, a die head carried by the spindle, opening and closing die jaws carried by the die head, means for biasing the die jaws to open position, means engaged by the die jaws at the end of the retractile movement of the spindle for closing the die jaws and movable with the latter during advancing movement of the spindle to maintain the die jaws closed, cam mechanism for effecting movement of said means relatively to the die jaws at a predetermined point in the advancing movement of said spindle and die head in order that the biasing means may be rendered effective to open the die jaws, and common driving means for the cam mechanisms.

2. In a machine for threading bolts or the like, the combination of a rotatable spindle, cam mechanism for advancing and retracting the spindle, a die head carried by the spindle, opening and closing die jaws carried by the die head, means for biasing the die jaws to open position, means engaged by the die jaws at the end of the retractile movement of the spindle for closing the die jaws and movable with the latter during advancing movement of the spindle to maintain the die jaws closed, cam mechanism for effecting movement of said means relatively to the die jaws at a predetermined point in the advancing movement of said spindle and die head in order that the biasing means may be rendered effective to open the die jaws, common driving means for the cam mechanisms, and means for adjusting the second-named cam mechanism in order that movement of said relatively movable means may take place at a desired point in the advancing movement of the spindle and die head.

3. In a machine for threading bolts or the like and having a stationary frame, a rotatable die head carrying a plurality of dies movable into closed and open position, a blank holder adapted to be fixed to the frame, means for advancing and retracting said head relative to said holder, a member for maintaining said dies in closed position as said head is advanced, cooperating means on said member and head for causing said member to move with said head as the same is advanced, means movable relatively to the frame for moving said member relative to said head to permit opening of said dies after the threading operation is completed, and an adjustable device for varying the time of operation of said last named means whereby the length of thread cut may be varied.

4. In a machine for threading bolts or the like and having a stationary frame, a rotatable spindle, a die head secured thereto and carrying a plurality of dies movable into closed and open position, a blank holder adapted to be fixed to the frame, means for moving said spindle axially whereby said head is advanced and retracted relative to said holder, a member slidably mounted on said spindle rearwardly of said head, inter-engaging means on said member and head for causing said member to move with said head when the same is advanced, means controlled by said member when in engagement with said head for maintaining said dies closed, and means movable relatively to the frame for moving said member out of engagement with said head to permit opening of said dies when the desired length of thread is cut.

5. In a machine for threading bolts or the like and having a stationary frame, a blank holder adapted to be fixed to the frame, a spindle, a die head carried thereby, means for rotating said spindle and for moving the same axially to advance and retract said head relative to the holder, said head having a plurality of dies movable into closed and into open position, a cone-shaped member slidably mounted on said spindle rearwardly of said head, means for maintaining said dies in closed position when said cone-shaped member is in engagement with the head, and means for moving said member out of engagement with the head to permit opening of said dies after the desired length of thread is cut, said last named means including a yoke engaging said member, a slidable rod to which said yoke is secured, and means for moving said rod relatively to said frame and operated by said first-named means.

6. In a machine for threading bolts or the like, a blank holder, a spindle, a die head carried thereby, means for rotating said spindle and for moving the same axially to advance and retract said head relative to the holder, said head having a plurality of dies movable into closed and into open position, a cone-shaped member slidably mounted on said spindle rearwardly of said head, means for maintaining said dies in closed position when said cone-shaped member is in engagement with the head, and means for moving said member out of engagement with the head to permit opening of said dies after the desired length of thread is cut, said last named means including a yoke engaging said member, a slidable rod to which said yoke is secured, a swinging arm for moving said rod, and a cam for swinging said arm.

7. In a machine for threading bolts or the like and having a stationary frame, a blank holder adapted to be fixed to the frame, a rotatable die head movable axially toward and away from the blank holder, a plurality of opening and closing dies carried by the die head, means effective to bias the dies to open position, means movable toward the head in order to overcome said biasing means and to effect closing movement of the dies and movable away from the head in order that the biasing means may open the dies, said last-named means after effecting closing movement of the dies being movable with the head during the threading operation, a yoke engaging said movable means, a slidable rod connected to the yoke, an arm pivoted with respect to the frame and adapted to engage and move said rod in order to move said movable means away from the head so as to permit the biasing means to open the dies and terminate the threading operation, and a cam for moving said arm.

8. In a machine for threading bolts or the like, a rotatable die head carrying a plurality of dies, means for opening and closing said dies comprising a cone-shaped member movable toward and from said head, a yoke engaging said member, a slidable rod having an abutment, a pivoted arm through which said rod passes and having a part adapted to engage said abutment, and cam means for moving said arm.

9. In a machine for threading bolts or the like, a blank holder, a spindle, a die head secured thereto and carrying a plurality of dies, a cam shaft, means operated from said shaft for moving said spindle axially to advance and retract said head relative to said holder, means for opening and closing said dies, said means comprising a cone-shaped member slidably mounted on said spindle at the rear of said head, a yoke for engaging and moving said member, a slidably supported rod connected to said yoke and means operated from said cam shaft for moving said rod.

10. In mechanism of the kind described, a die head carrying a plurality of dies, a cone-shaped member movable relative to said head, a yoke for engaging and moving said member, a slidable rod connected to said yoke, a pivoted arm for sliding said rod, a cam for engaging and moving said arm, and an adjustable device for varying the position occupied by said arm when engaged by said cam.

11. In mechanism of the kind described, a blank holder, a spindle, a die head secured thereto, means for rotating said spindle and for moving the same axially, whereby said head is advanced and retracted relative to said holder, a plurality of dies carried by said head, a cone-shaped member slidably mounted on said spindle at the rear of said head, cooperating means on said member and head for causing said member to move with the head as the same is advanced, means for maintaining said jaws in closed position when said member is in engagement with said head, means for moving said member out of engagement with the head when the desired length of thread is cut, said last named means comprising a yoke engaging said head, a slidable rod connected to said yoke, a swinging arm for moving said rod, and a cam for swinging said arm.

12. In a threading machine having a frame, the combination of a rotatable and axially movable spindle, a die head fixed relatively to the spindle and carrying opening and closing die members, a bearing for the spindle fixed to the frame and located adjacent to the die head, means movable with respect to the spindle and the die head to move the die members to closed position, means carried by the first-named means and projecting between the die head and said bearing and adapted to contact with the latter during a portion of the movement of the spindle axially in one direction to move the die members to closed position, means cooperating with said projecting means for moving the latter relatively to the die head to move the die moving means in such a direction as to permit the die members to open, and means movable relatively to the frame for operating the last-named means during such relative movement to open the die members at any desired point during the axial movement of the spindle in the other direction.

13. In a threading machine, the combination of a rotatable and axially movable spindle, a die head fixed relatively to the spindle and carrying die members movable into open and closed positions, a bearing for the spindle located adjacent to the die head, a member carried by and movable with respect to the spindle for moving the die members to closed position, said member projecting between the die head and the bearing and adapted to contact with the latter during a portion of the movement of the spindle axially in one direction for moving the die members to closed position, a yoke engaging said member, a slidable rod connected to the yoke, said head, member, yoke and rod being adapted to move together axially during the threading operation, and means operating in timed relation with respect to the machine to move the rod, yoke and said member relatively to the spindle and said head to permit the die members to move to open position at a predetermined point during axial movement of the spindle in the other direction.

14. In a machine for threading bolts or the like, a rotatable die head carrying a plurality of dies, means for opening and closing said dies including a member movable toward and from said head, a yoke engaging said member, a slidable rod connected to said yoke and having an abutment, a floating member adapted to engage said abutment, and means for moving said floating member.

15. In a machine for threading bolts or the like, a rotatable die head carrying a plurality of dies, means for opening and closing said dies including a member movable toward and from said head, movement of said member toward the head resulting in closing of the dies and movement thereof from the head resulting in opening of the dies, a yoke engaging said member, a slidable rod connected to said yoke and having an abutment, a floating member having a portion within the path of travel of said abutment and adapted to engage the latter to move the slidable rod in such a direction as to move said member away from the die head, said floating member having abutment means, rotatable abutment means adapted to contact with the abutment means of the floating member to effect movement of the slidable rod to permit opening of the dies, and means for adjusting the initial position of the floating member in order to vary the timing of opening of the dies with respect to the operation of the machine.

In testimony whereof I hereunto affix my signature.

JAMES A. KINNEY.